United States Patent [19]

Tsukamoto et al.

[11] Patent Number: 4,590,907
[45] Date of Patent: May 27, 1986

[54] METHOD OF ADAPTIVELY CONTROLLING INDIVIDUAL CYLINDER FUEL INJECTION QUANTITIES IN ELECTRONICALLY CONTROLLED DIESEL ENGINE AND DEVICE THEREFOR

[75] Inventors: Keisuke Tsukamoto, Nagoya; Masaomi Nagase; Kiyotaka Matsuno, both of Toyota, all of Japan

[73] Assignee: Toyota Jidosha Kabushiki Kaisha, Toyota, Japan

[21] Appl. No.: 704,417

[22] Filed: Feb. 22, 1985

[30] Foreign Application Priority Data

Mar. 2, 1984 [JP] Japan .................. 59-41063

[51] Int. Cl.$^4$ .................. F02D 31/00
[52] U.S. Cl. .................. 123/357
[58] Field of Search ............ 123/357, 358, 359, 419, 123/503

[56] References Cited

U.S. PATENT DOCUMENTS

| 4,372,266 | 2/1983 | Hiyama et al. | 123/357 |
| 4,416,232 | 11/1983 | Shiozaki et al. | 123/357 |
| 4,497,294 | 2/1985 | Izumi et al. | 123/357 |
| 4,502,439 | 3/1985 | Nagase et al. | 123/357 |

FOREIGN PATENT DOCUMENTS

| 88426 | 5/1983 | Japan | 123/357 |
| 214627 | 12/1983 | Japan | 123/357 |
| 214631 | 12/1983 | Japan | 123/357 |
| 12135 | 1/1984 | Japan | 123/357 |
| 12139 | 1/1984 | Japan | 123/357 |

Primary Examiner—Magdalen Y. C. Moy

[57] ABSTRACT

In effecting individual cylinder fuel injection control in an electronically controlled diesel engine, wherein rpm variations with every explosion cylinder are detected and compared with one another, the increase or decrease in the fuel injection quantity with every cylinder is learned until rpm variations of the respective cylinders become uniform, and a fuel injection quantity control actuator is controlled with every cylinder, so that engine vibrations due to a dispersion in fuel injection quantity between the cylinders can be controlled, an adaptive correction quantity is determined in accordance with an rpm variation deviation obtained from a difference between a mean rpm variation and rpm variations of the respective cylinders, and the engine temperature or the fuel temperature, and the fuel injection quantity control actuator is controlled with every cylinder in accordance with the adaptive correction quantity, to thereby prevent the divergence of the correction quantity.

7 Claims, 14 Drawing Figures

METHOD OF ADAPTIVELY CONTROLLING INDIVIDUAL CYLINDER FUEL INJECTION QUANTITIES IN ELECTRONICALLY CONTROLLED DIESEL ENGINE AND DEVICE THEREFOR

BACKGROUND OF THE INVENTION

1. Field of the Invention

This invention relates to a method of adaptively controlling individual cylinder fuel injection quantities in an electronically controlled diesel engine and a device therefor, and particularly to improvements in a method of adaptively controlling individual cylinder fuel injection quantities in an electronically controlled diesel engine and a device therefor, suitable for use in an electronically controlled diesel engine in a motor vehicle, wherein rpm variations with every explosion cylinder are detected and compared with each other, the increase or decrease of the fuel injection quantities are learned with every cylinder until the rpm variations of the respective cylinders become uniform, and a fuel injection quantity control actuator is controlled with every cylinder, so that engine vibrations due to a dispersion in fuel injection quantity between the cylinders can be reduced.

2. Description of the Prior Art

In general, the vibrations of a diesel engine during idling are by far higher than those of a gasoline engine. The diesel engine resiliently supported by an engine mounting mechanism resonates with the engine vibrations, resulting in not only worsening the comfortableness of a vehicle, but also adversely affecting components around the engine. This is mainly caused by the vibrations of the primary/secondary low frequencies attributed to periodical dispersions of the fuel fed under pressure to the respective cylinders at a cycle only half the rotation rate of the diesel engine when the diesel engine is of four cycle type for example. More specifically, in a diesel engine, if a dispersion occurs in the fuel injection quantity between the cylinders, then, as shown in FIG. 1, the rpm variations ΔNE between the explosion cylinders (in the case of the engine of four cylinders, 180° CA (crank angle)) are not equal to one another, whereby surging S of deviations about a crank angle occurs at a cycle of every four explosions, which surge gives an uncomfortable feeling to an occupant of a vehicle. In the drawing, a top dead center position designated as TDC.

For this, it is conceivable that an engine body, a fuel injection pump and an injection nozzle are manufactured with very high accuracies, so that a dispersion in fuel quantities fed to respective cylinders can be reduced. However, to achieve this, great difficulties in production engineering are encountered, and a fuel injection pump and the like become very expensive. On the other hand, it is also conceivable that an engine mounting mechanism is improved so as to reduce the vibrations of the engine. However, the mounting mechanism becomes complicated and expensive, and further, the vibrations of the diesel engine itself are not reduced thereby, thus not enabling to offer the fundamental solution of the problem.

To obviate the above-described problem, it is conceivable that an NE raw wave form is obtained by a gear 20 secured to a drive shaft 14 of a fuel injection pump 12 and an engine rotation sensor 22 mounted to a pump housing 12A as shown in FIG. 2 for example, an engine speed NEi(i=1 to 4) through a rotation of 45° CA immediately before the cylinder to be corrected is calculated from the time duration T needed for the rotation through 45° CA, i.e. the rotation through 22.5° PA (pump angle) (45° CA of the engine) of the drive shaft 14 for example, which is detected by a fall of an NE pulse having formed the NE raw wave form as shown in FIG. 3, an rpm variation $DNE_p$(p=1 to 4) with every explosion cylinder is detected from the engine speed NEi as shown in FIG. 4. The resultant value is compared with a mean value (hereinafter referred to as a "mean rpm variation")

$$WNDLT\left( = \sum_{p=1}^{4} DNE_p/4 \right)$$

of the rpm variations of all of the cylinders. When the rpm variation of the cylinder is smaller than the mean rpm variation WNDLT, the fuel injection quantity of the cylinder is regarded to be too small; a fuel injection quantity (hereinafter referred to as an "everytime correction quantity")Δq to be increased is learned in accordance with a difference (hereinafter referred to as an "rpm variation deviation") $DDNE_p$(p=1 to 4), as shown in FIG. 5 for example, and is reflected at the time of a subsequent fuel injection of the cylinder. On the contrary, when the rpm variation of the cylinder is larger than the mean rpm variation WNDLT, the everytime correction quantity Δq is decreased to decrease the fuel injection quantity of the cylinder. A fuel injection control actuator, such for example as a spill actuator for controlling a spill ring in a distribution type fuel injection pump is controlled with every cylinder until the rpm variations of the respective cylinders become uniform as illustrated in FIG. 6 (under low temperature) for example, whereby the fuel injection quantity is increased or decreased with every cylinder, so that the dispersion in fuel injection quantity between the cylinders can be obviated, thereby enabling to reduce the engine vibrations.

Referring to FIG. 6, $\Delta Q_p$(p=1 to 4) is an individual cylinder correction quantity as being an integrated value of the everytime correction quantities Δq, $K_5$ is a coefficient of correction for preventing hunting when the engine speed is within a range between 1000 rpm and 1500 rpm during neutral position, wherein the higher the engine speed is, the lower the individual cylinder correction quantity is made, $Q_{fin}$ is an injection quantity calculated from a mean engine speed NE, an accelerator opening Accp and the like, and Vsp is an output from a spill position sensor for detecting a displacement of the spill actuator.

However, since the everytime correction quantity Δq has heretofore been set at a constant value, but not determined by the temperature, in some cases, the movement of the spill ring has not reached the individual cylinder correction quantity ΔQp by the injection time under the low temperature, where the fuel viscosity is high as shown in FIG. 6. Then, since the individual cylinder correction quantity ΔQp is not satisfactorily corrected, such a vicious circle arises that the rpm variation deviation DDNEp(=WNDLT−DNEp) is not decreased and the everytime correction quantity Δq of the succeeding time corresponding to the rpm variation deviation DDNEp is further integrated to the individual cylinder correction quantity ΔQp, whereby, even with a very small dispersion in fuel injection quantity between the cylinders, the individual cylinder correction quantity ΔQp is diverged to the upper and lower limit values as shown in FIG. 7 (an example of the coolant temperature of −20°C. or less), thereby presenting such a disadvantage that a smooth adaptive control cannot be effected.

SUMMARY OF THE INVENTION

The present invention has been developed to obviate the above-described disadvantages of the prior art and has as its object the provision of a method of adaptively controlling individual cylinder fuel injection quantities in an electronically controlled diesel engine, wherein, even when the temperature is low, the correction quantity is not diverged due to a very small dispersion in fuel injection quantity between the cylinders, and consequently, smooth adaptive control is effected, so that the level of vibrations can be reduced to the minimum, and a device therefor.

To the above end, the present invention contemplates that, in a method of adaptively controlling individual cylinder fuel injection quantities in an electronically controlled diesel engine, wherein rpm variations with every explosion cylinder are detected and compared with one another, the increase or decrease of the fuel injection quantities are learned with every cylinder until the rpm variations of the cylinders become uniform, and a fuel injection quantity control actuator is controlled with every cylinder, so that engine vibrations due to a dispersion in the fuel injection quantity between the cylinders can be reduced, as the technical gist thereof is illustrated in FIG. 8, the method comprises the steps of:

detecting engine temperature or fuel temperature;

determining an rpm variation deviation of each cylinder from the difference between a mean rpm variation of all the cylinders and the rpm variations of the respective cylinders;

determining an everytime correction quantity in accordance with the rpm variation deviation and the engine temperature or the fuel temperature, and determining an individual cylinder correction quantity by integrating said everytime correction quantities of every cylinder.

To the above end, the present invention contemplates that, in a device for adaptively controlling individual cylinder fuel injection quantities in an electronically controlled diesel engine, the device comprises:

a fuel injection pump including a spill ring and a spill actuator, for controlling fuel injection quantities;

injection nozzles for injecting fuel discharged from the fuel injection pump into combustion chambers;

an accelerator sensor for detecting an accelerator opening;

an engine rotation sensor for detecting an engine speed;

a temperature sensor for detecting the engine temperature or the fuel temperature; and a control unit for determining a target injection quantity at least from the accelerator opening and the engine speed, controlling the spill actuator so that the fuel of the target injection quantity can be discharged from the fuel injection pump, determining an everytime correction quantity in accordance with an rpm variation of each cylinder, obtained from a difference between the mean rpm variation of all the cylinders and the rpm variations of the respective cylinders, and the engine temperature or the fuel temperature so as to eliminate a dispersion in the rpm variation, determining a correction quantity by integrating said everytime correction quantities of every cylinder, and controlling the spill actuator with every cylinder in accordance with the individual cylinder correction quantity.

A specific form of the present invention is of such an arrangement that the engine temperature is regarded as the coolant temperature, whereby necessity of a separate temperature sensor is eliminated, thus avoiding the cost increase.

Another specific form of the present invention is of such an arrangement that the fuel temperature is regarded as the fuel temperature in the fuel injection pump, so that the fuel viscosity in the fuel injection pump can be more accurately predicted.

A further specific form of the present invention is of such an arrangement that the individual cylinder correction quantity is reduced to a small value when the engine temperature or the fuel temperature is lower than the normal temperature, so that the interference of the correction between the cylinders can be prevented when the temperature is lower than the normal temperature.

A still further specific form of the present invention is of such an arrangement that the individual cylinder correction quantity is reduced to a small value and a non-sensitive zone is expanded when the engine temperature or the fuel temperature is lower than the normal temperature, so that the divergence of the correction quantity due to a very small dispersion in fuel injection quantity between the cylinders can be reliably prevented when the temperature is lower than the normal temperature.

According to the present invention, the individual cylinder correction quantity is determined not only from a difference between the mean rpm variation and the rpm variations of the respective cylinders, namely, an rpm variation deviation but also in consideration of the engine temperature or the fuel temperature, whereby, when the temperature is low for example, the individual cylinder correction quantity is reduced to a small value and the non-sensitive zone is expanded, so that the divergence of the individual cylinder correction quantity to the upper and lower limit values due to a very small dispersion in fuel injection quantity between the cylinders can be prevented when the temperature is low. In consequence, the level of vibrations can be reduced to the minimum. Hence, the quality levels for the dispersion of the individual cylinder injection quantity of the fuel injection pump and for the dispersion of the valve opening pressure of the injection nozzles can be lowered, thus enabling to reduce the costs.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of embodiments of the electronically controlled diesel engine in a motor vehicle, to which is applied the method of adaptively controlling individual cylinder fuel injection quantities according to the present invention, with reference to the drawings.

Figure 9:
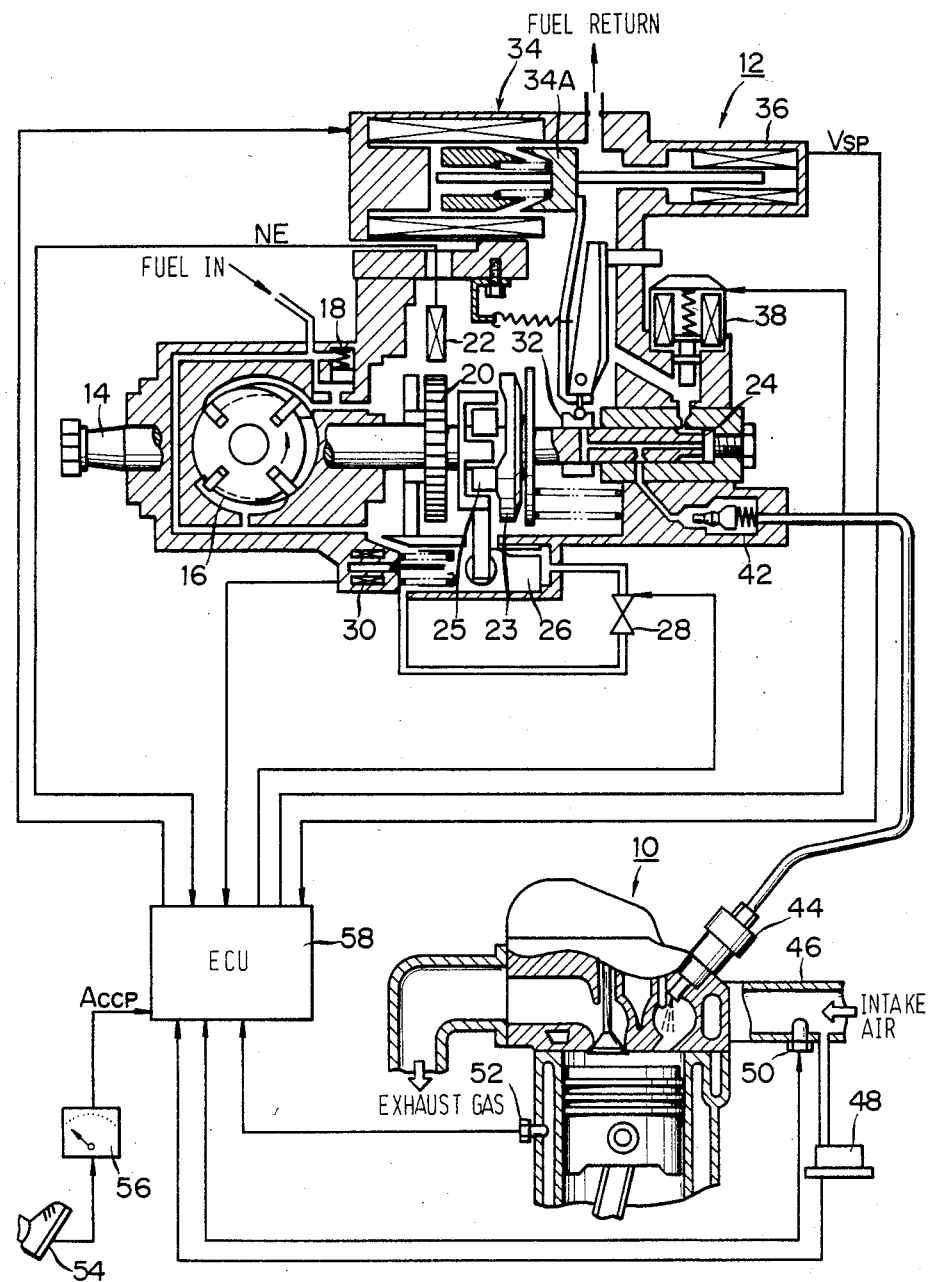
FIG. 9 is a sectional view, partially including a block diagram, showing the general arrangement of an embodiment of the electronically controlled diesel engine in a motor vehicle, to which the present invention is applied.

As shown in FIG. 9, the embodiment of the present invention comprises:

a distribution type fuel injection pump 12 including a drive shaft 14 rotatable in association with the rotation of a crankshaft of a diesel engine 10, a feed pump 16 (FIG. 9 shows a state of the feed pump unfolded through 90°) solidly secured to the drive shaft 14, for feeding the fuel under pressure, a fuel pressure regulating valve 18 for regulating fuel feeding pressure, an engine rotation sensor 22 formed of an electromagnetic pickup for example, for detecting the rotating condition of a diesel engine 10 from a rotary displacement of a gear 20 solidly secured to the drive shaft 14, a roller ring 25 for driving a pump plunger 24 in cooperation with a face cam 23, a timer piston 26 (FIG. 9 shows a state of the timer piston unfolded through 90°) for controlling the rotational position of the roller ring 25, a timing controlling valve 28 for controlling the position of the timer piston 26 to control the fuel injection timing, a timer position sensor 30 formed of a variable inductance sensor for example, for detecting a position of the timer piston 26, a spill ring 32 for controlling the fuel spill timing from the pump plunger 24, a spill actuator 34 for controlling the position of the spill ring 32 to control the fuel injection quantity, a spill position sensor 36 formed of a variable inductance sensor for example, for detecting a position Vsp of the spill ring 32 from a displacement of a plunger 34A of the spill actuator 34, a fuel cutting solenoid (hereinafter referred to as an "FCV") 38 for cutting the fuel during stop of the engine in operation, and a delivery valve 42 for preventing the counterflow and after-dripping of fuel;

injection nozzles 44 for injecting the fuel discharged from the delivery valve 42 of the fuel injection pump 12 into combustion chambers of the diesel engine 10;

an intake air pressure sensor 48 for detecting the pressure of intake air taken in through an intake pipe 46;

an intake air temperature sensor 50 for detecting the temperature of the intake air;

a coolant temperature sensor 52 provided on a cylinder block of the engine 10, for detecting engine coolant temperature;

an accelerator sensor 56 for detecting a depressing angle (hereinafter referred to as an "accelerator opening") Accp of an accelerator pedal 54 operated by a driver; and an electronic control unit (hereinafter referred to as an "ECU") 58 for determining a target injection timing and a target injection quantity from the accelerator opening Accp detected from an output of the accelerator sensor 56, the engine speed NE obtained from an output of the engine rotation sensor 22, the engine coolant temperature detected by the coolant temperature sensor 52 and so on, and for controlling the timing controlling valve 28, the spill actuator 34 and the like, so that the fuel of the target injection quantity can be injected from the fuel injection pump 12 at the target injection timing.

Figure 10:
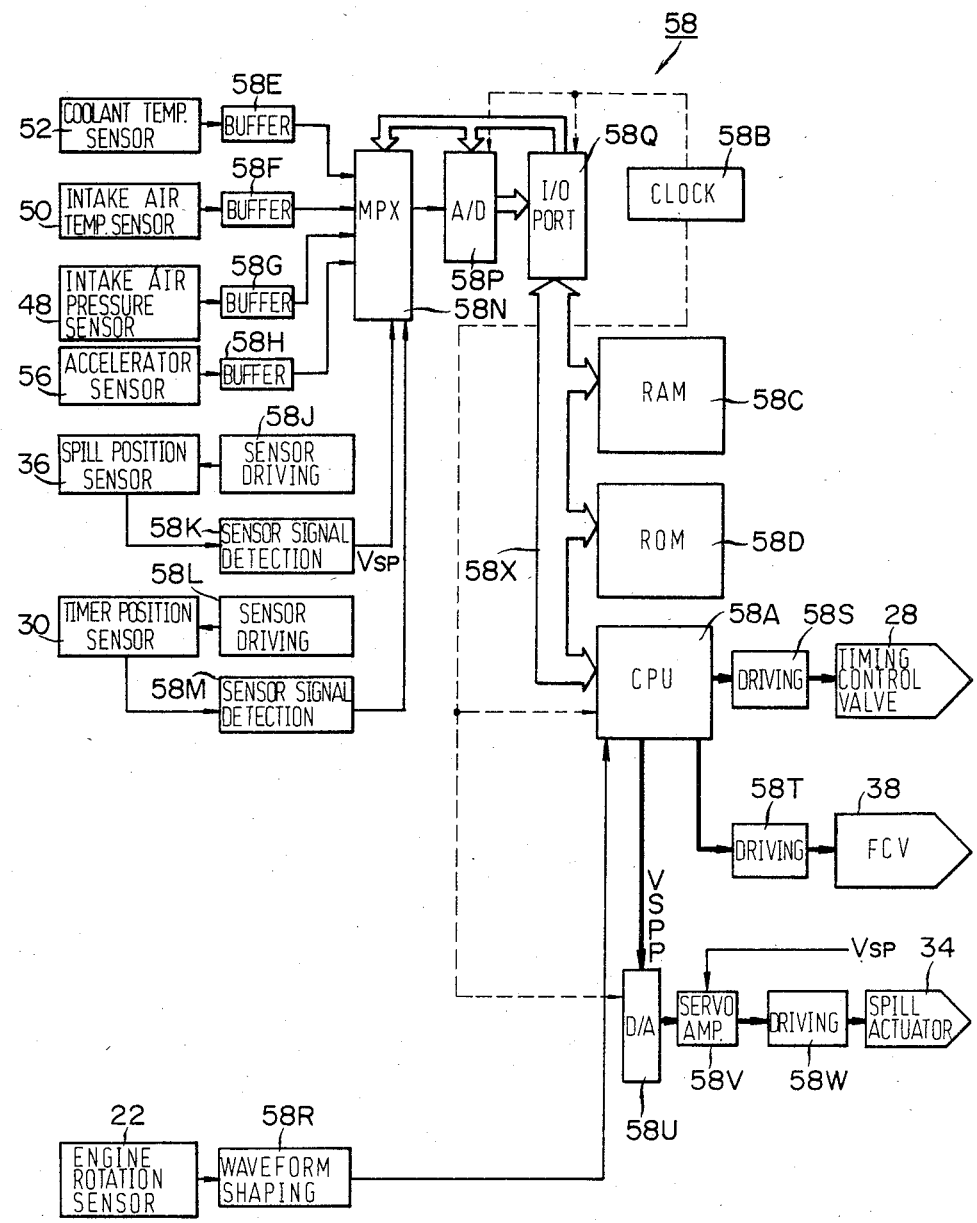
FIG. 10 is a block diagram showing the arrangement of the electronic control unit used in the embodiment.

As shown in FIG. 10, the ECU 58 comprises:

a central processing unit (hereinafter referred to as a "CPU") 58A formed of a microprocessor for example, for performing various operations and processings;

a clock 58B for generating various clock signals;

a random access memory (hereinafter referred to an a "RAM") 58C for temporarily storing operational data and the like in the CPU 58A;

a read only memory (hereinafter referred to as a "ROM") 58D for storing control programs, various data and the like;

a multiplexer (hereinafter referred to as an "MPX") 58N for successively taking in an output from the coolant temperature sensor 52, which is inputted through a buffer 58E, an output from the intake air temperature sensor 50, which is inputted through a buffer 58F, an output from the intake air pressure sensor 48, which is inputted through a buffer 58G, an output from the accelerator sensor 56, which is inputted through a buffer 58H, the output Vsp from the spill position sensor 36, which is driven in response to a sensor driving frequency signal outputted from a sensor driving circuit 58J, and inputted through a sensor signal detecting circuit 58K, an output from the timer position sensor 30, which is driven in response to a sensor driving frequency signal outputted from a sensor driving eircuit 58L, and inputted through a sensor signal detecting circuit 58M and so on;

an analogue-digital converter (hereinafter referred to as an "A/D converter") 58P for converting analogue signals outputted from the MPX 58N into digital signals;

an input-output port (hereinafter referred to as an "I/O port") 58Q for taking an output from the A/D converter 58P into the CPU 58A;

a waveform shaping circuit 58R for waveform-shaping an output from the engine rotation sensor 22 and directly taking the same into the CPU 58A;

a driving circuit 58S for driving the timing controlling valve 28 in accordance with the result of operation of the CPU 58A;

a driving circuit 58T for driving the FCV 38 in accordance with the result of operation of the CPU 58A;

a servo amplifier 58V and a driving circuit 50W, for driving the spill actuator 34 in accordance with a deviation between a spill position signal Vsp outputted from the spill position sensor 36 and an output from the CPU 58A, which is converted into an analogue signal by a digital-analogue converter (hereinafter referred to as a "D/A converter") 58U; and a common bus 58X for connecting the above-mentioned components to one another.

Description will hereunder be given of action of the embodiment.

Figure 11:
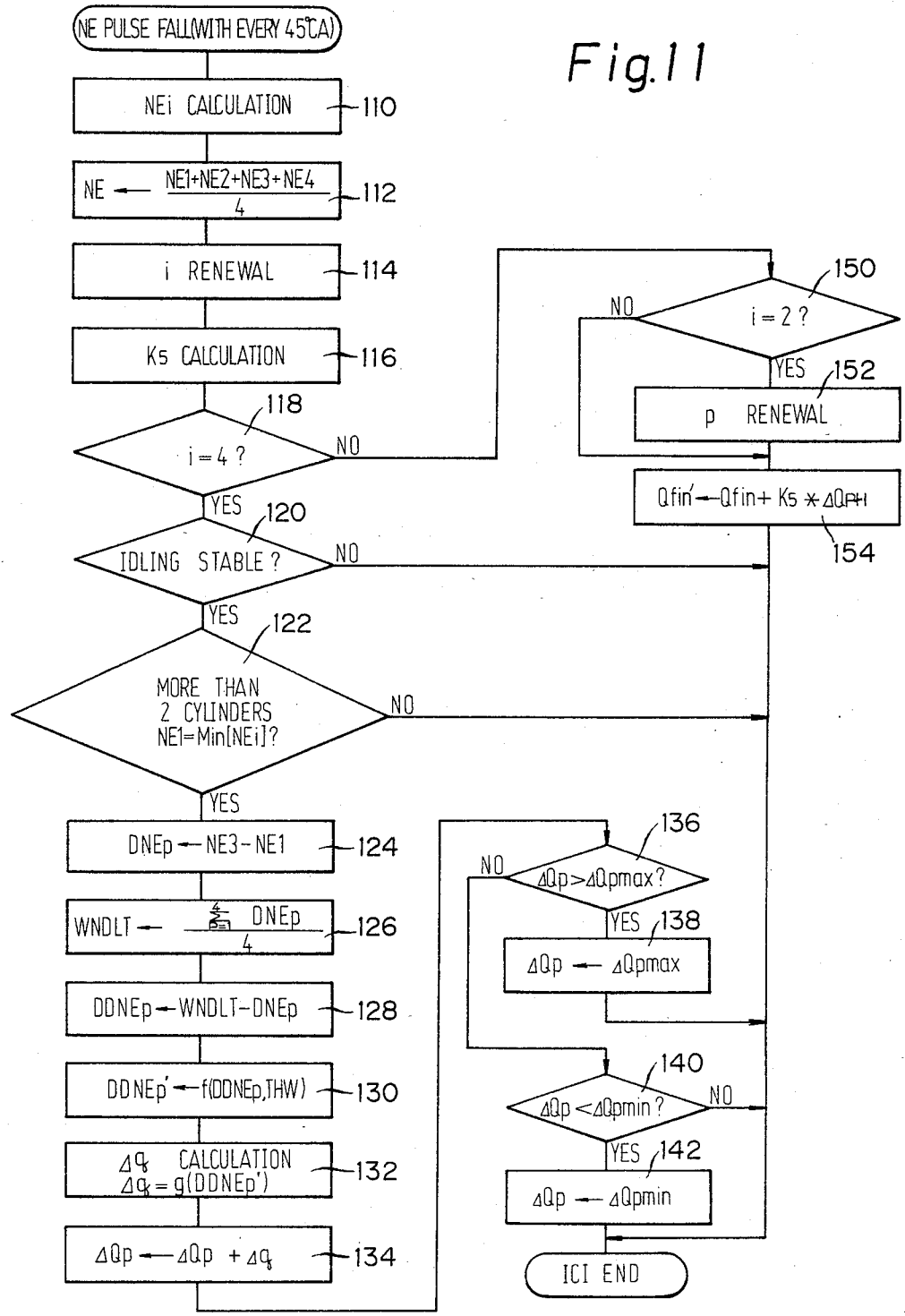
FIG. 11 is a flow chart showing the interrupt routine for determining the everytime correction quantities and the individual cylinder correction quantities.

Calculation of the everytime correction quantities $\Delta q$ and the individual cylinder correction quantities $\Delta Qp$ in the embodiment is carried out by an input capture interrupt routine ICI passing with every 45° CA as shown in FIG. 11.

Figure 3:
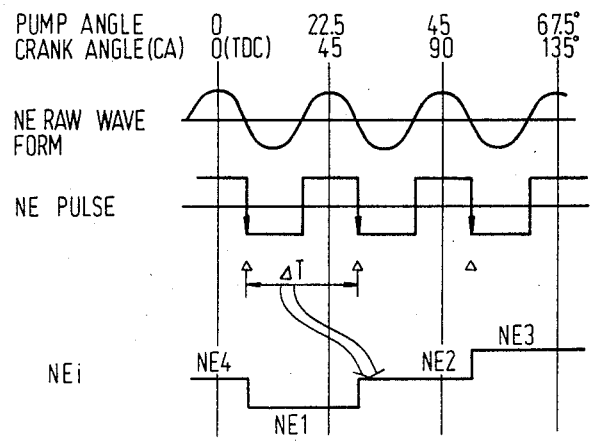
FIG. 3 is a graphic chart showing the conventional method of determining the engine speed through 45° CA.

More specifically, simultaneously with a fall of an NE pulse outputted with every 45° CA from the engine rotation sensor 22, the routine proceeds to Step 110, and, as shown in FIG. 3, an engine speed $NEi (i=1$ to $4)$ with every 45°CA is calculated from a time duration $\Delta T$ from a fall of NE pulse of the last time to a fall of NE pulse of this time. A counter i is renewed in a sequence of 1 - 2 - 3 - 4 - 1 by falls of NE pulses, whereby this engine speed NEi is renewed in a sequence of $NE_1$ - $NE_2$ - $NE_3$ - $NE_4$ - $NE_1$ with every 180°CA and stored in the respective memories.

Subsequently, the routine proceeds to Step 112, where a mean engine speed NE through 180°CA is calculated as shown in the following equation.

$$NE = (NE_1 + NE_2 + NE_3 + NE_4)/4 \quad (1)$$

Figure 12:
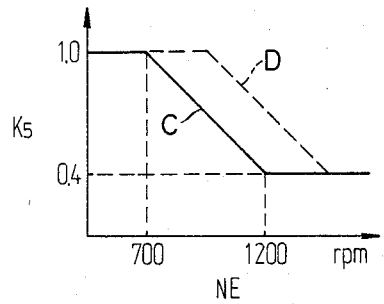
FIG. 12 is a graphic chart showing a map used in the aforesaid routine, for determining the coefficient of correction.

Then, the routine proceeds to Step 114, where the counter i is renewed, and thereafter, in Step 116, a coefficient of correction $K_5$ corresponding to the engine speed NE, for preventing the hunting when the engine speed is relatively high, such as 1000 rpm–1500 rpm, is calculated from a map having the relationship indicated by broken lines D in FIG. 12, which is previously stored in the ROM 58D.

Since the coefficient of correction $K_5$ (broken lines D) used herein can take a value larger than conventional $K_5$ (solid line C) used in the conventional example as indicated in FIG. 12, the correction can be performed more accurately. This is because the engine hunting at the time of 1000 rpm–1500 rpm is mainly caused by the delay in reach of the spill ring. Therefore, if the delay in reach can be prevented as in this embodiment, then the scope between the upper and lower limits of the individual cylinder correction quantities can be widened accordingly.

Figure 4:
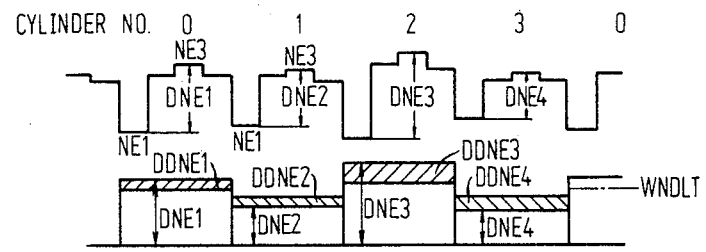
FIGS. 4 and 5 are graphic charts showing the conventional method of determining everytime correction quantities.

Subsequently, the routine proceeds to Step 118, where judgment is made as to whether the counted value of the counter i is 4 or not. When the result of judgment is positive, namely, it is immediately after the renewal in a sequence of 3 to 4 of the counter i, the routine proceeds to Step 120, where judgment is made as to whether the idling is in the stable state or not. When the result of judgment is positive, namely, there are established all of such conditions that it is neither the time of starting nor the time immediately after the starting, the accelerator opening Accp is 0%, the shift position of a transmission is neutral or a drive range is selected and the vehicle speed is zero in the case of an automatic transmission, for example, the routine proceeds to Step 122, where judgment is made as to whether there are two or more cylinders, in which the engine speed $NE_1$ is the minimum value out of $NE_1$—$NE_4$ for one and the same cylinder p, or not. When the result of judgment is positive, namely, it is judged that no misfire and the like occur and the rotation is in the stable conditions, the routine proceeds to Step 124, where rpm variations $DNE_p (p=1$ to $4)$ corresponding to the respective cylinders are calculated through the following equation, as shown in FIG. 4, and stored in the respective memories.

$$DNE_p \leftarrow NE_3 - NE_1 \quad (2)$$

Herein, a counter p is associated with the respective cylinders, when the counter i is changed in a sequence of 4 to 1, the renewals in a sequence of 1 - 2 - 3 - 4 - 1 are made, and one turn is completed through 720°CA.

Subsequently, the routine proceeds to Step 126, where a mean rpm variation WNDLT is calculated through the following formula and stored.

$$WNDLT \leftarrow \sum_{p=1}^{4} DNE_p / 4 \quad (3)$$

Then, the routine proceeds to Step 128, where an rpm variation deviation $DDNE_p$ between the mean rpm variation WNDLT and the rpm variation $DNE_p$ of the respective cylinders is calculated through the following formula.

$$DDNE_p \leftarrow WNDLT - DNE_p \quad (4)$$

Figure 13:
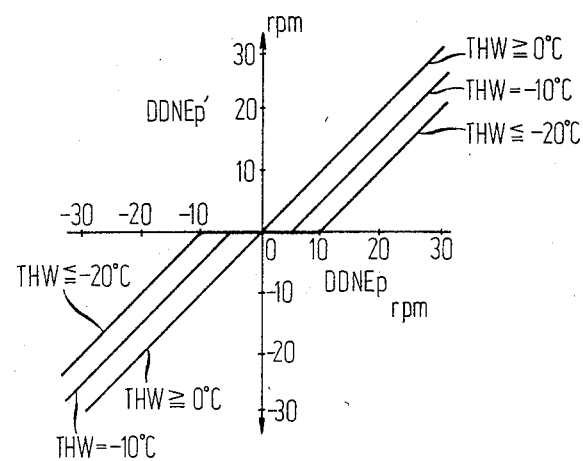
FIG. 13 is a graphic chart showing an example of a map for determining an rpm variation deviation for the control as used in the above routine.

Subsequently, the routine proceeds to Step 130, where an rpm variation deviation DDNEp' for the control is determined from the relationship shown in FIG. 13 for example, through the following formula in accordance with the rpm variation deviation DDNEp calculated in the Step 128 and the coolant temperature THW previously obtained from an output of the coolant temperature sensor 52 by the one second routine and the like for example.

$$DDNEp' \leftarrow f(DDNEp, THW) \quad (5)$$

Figure 5:
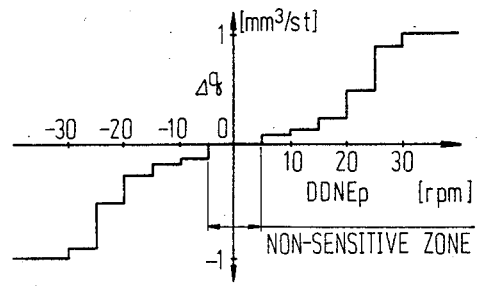
Figure 6:
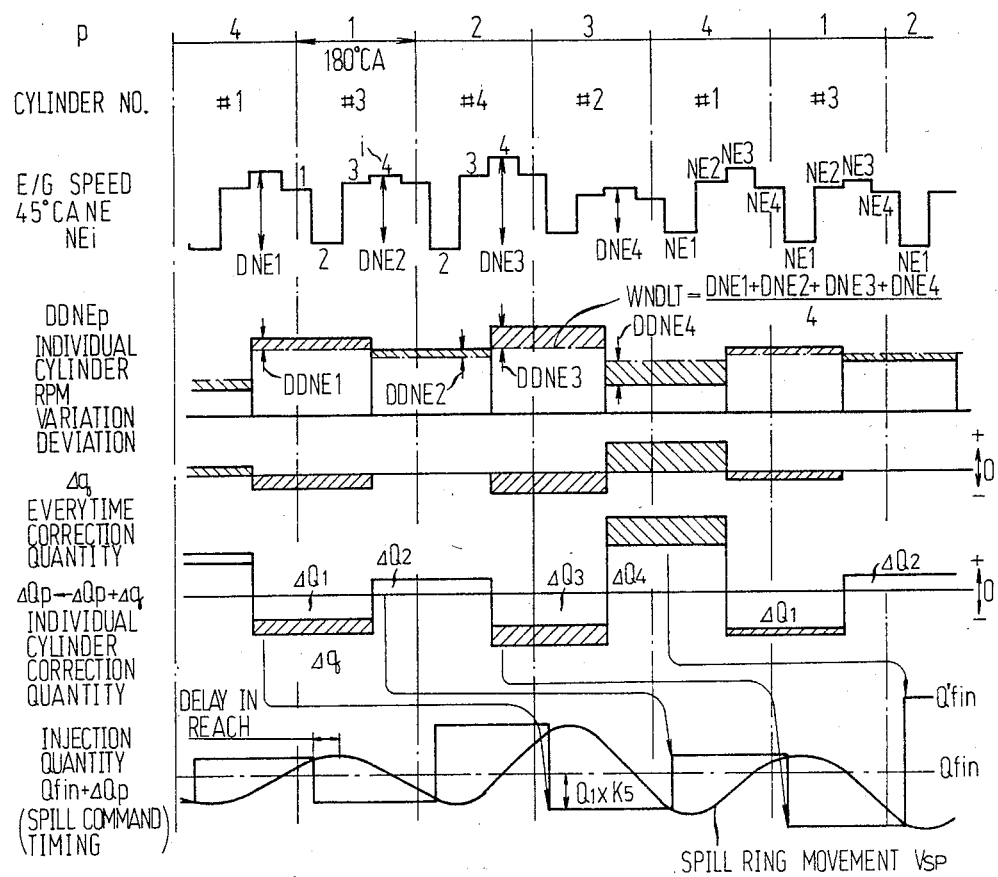
FIGS. 6 and 7 are graphic charts showing an example of signal wave forms in various portions in the prior art.
Figure 7:
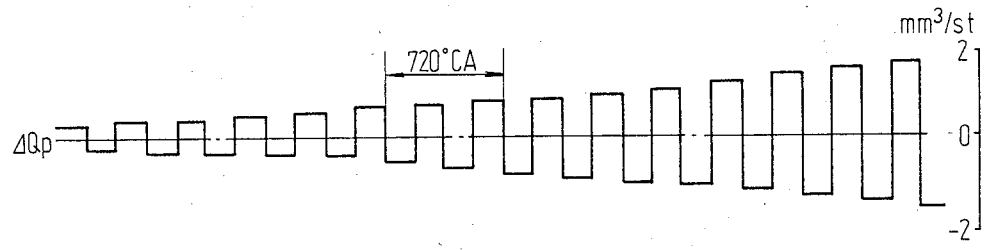
Figure 8:
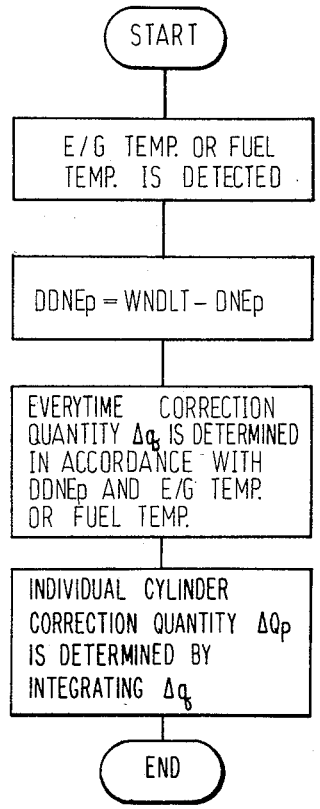
FIG. 8 is a flow chart showing the technical gist of the method of adaptively controlling individual cylinder fuel injection quantities in the electronicaly controlled diesel engine according to the present invention.

Then, the routine proceeds to Step 132, where an everytime correction quantity $\Delta q$ is calculated from the relationship shown in FIG. 5 for example, through the following equation in accordance with the rpm variation deviation DDNEp' for the control thus obtained.

$$\Delta q (DDNEp') \quad (6)$$

Subsequently, the routine proceeds to Step 134, where the everytime correction quantity $\Delta q$ obtained this time is integrated into an individual cylinder correction quantity $\Delta Qp$ as being the value integrated up to the last time as shown in the following formula and stored as the value of this time.

$$\Delta Qp \leftarrow \Delta Qp + \Delta q \quad (7)$$

Additionally, there are four individual cylinder correction quantities ΔQp as corresponding to the four cylinders.

Upon completion of the Step 134, the routine proceeds to Step 136, where judgment is made as to whether the individual cylinder correction quantity ΔQp calculated is higher than the upper limit value ΔQpmax thereof or not. When the result of judgment is positive, the routine proceeds to Step 138, where the upper limit value ΔQpmax is made to be the individual cylinder correction quantity ΔQp, thus completing this interrupt routine ICI.

On the other hand, when the result of judgment in the Step 136 is negative, the routine proceeds to Step 140, where judgment is made as to whether the individual cylinder correction quantity ΔQp is lower than the lower limit value ΔQpmin thereof or not. When the result of judgment is positive, the routine proceeds to Step 142, where the lower limit value ΔQpmin is made to be the individual cylinder correction quantity ΔQp, thereby completing this interrupt routine ICI.

Furthermore, when the result of judgment in the Step 140 is negative, the individual cylinder correction quantity ΔQp obtained in the Step 134 is adopted as it is, thus completing this interrupt routine ICI.

On the other hand, when the result of judgment in the Step 118 is negative, the routine proceeds to Step 150, where the counted value of the counter i is 2 or not. When the result of judgment is positive, namely, judgment is made that it is immediately after the counted value of the counter i is renewed in a sequence of 1 to 2, the routine proceeds to Step 152, where the counter p is renewed. Upon completion of the Step 152, or when the result of judgment in the Step 150 is negative, the routine proceeds to Step 154, where a product obtained by multiplying the individual cylinder correction quantity $\Delta Q_{p+1}$ by the correction coefficient $K_5$ is added to the injection quantity Qfin obtained from the mean engine speed NE and the accelerator opening Accp through the publicly known injection quantity calculating routine as shown in the following formula to thereby determine the final injection quantity Qfin'.

$$\text{Qfin}' \leftarrow \text{Qfin} + K_5 X \, \Delta Q_{p+1} \tag{8}$$

Upon completion of the Step 154, or when the result of judgment in the Step 120 or 122 is negative, this interrupt routine ICI is finished.

Figure 14:
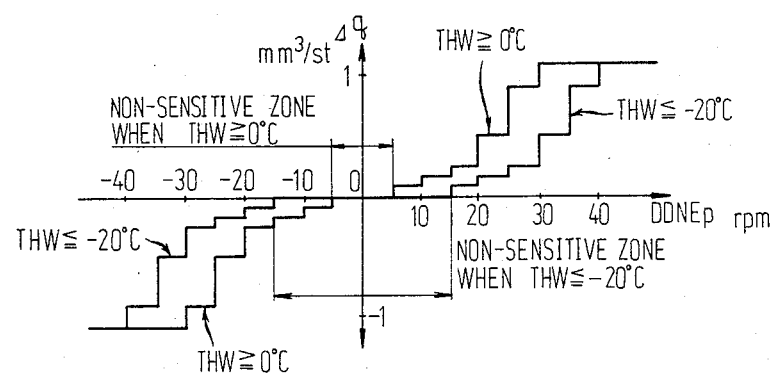
FIG. 14 is a graphic chart showing an example of the relationship between the rpm variation deviation and the everytime correction quantity in the above embodiment.

FIG. 14 shows an example of the relationship between the coolant temperature and the everytime correction quantity Δq. As apparent from the drawing, when the coolant water temperature THW becomes lower than $-20°$ C., the everytime correction quantity Δq becomes small and the non-sensitive zone, where the everytime correction quantity Δq equals to zero, is expanded. In consequence, when the rpm variation deviation is very small, the everytime correction quantity Δq equals to zero, whereby no divergence of the individual cylinder correction quantity ΔQp occurs due to the very small dispersion in injection quantity between the cylinders as in the past, so that the level of vibrations can be held to the minimum when the temperature is low.

In this embodiment, when the coolant temperature is lower than the normal temperature, the everytime correction quantity Δq is reduced to the small value, and, the non-sensitive zone, where the everytime correction quantity Δq equals to zero within a range of a predetermined value of the rpm variation deviation, is expanded, so that the divergence of the individual cylinder correction quantity ΔQp due to the dispersion in injection quantity between the cylinders can be reliably prevented. Additionally, the effect can be improved only by reducing the everytime correction quantity Δq when the coolant temperature is lower than the normal temperature.

Further, in this embodiment, since the everytime correction quantity Δq is varied in accordance with the coolant temperature, necessity of a separate temperature sensor is eliminated, and no cost increase occurs. Additionally, the temperature to be used as the index when the everytime correction quantity Δq is varied, need not necessarily be limited to the coolant temperature, and the oil temperature, the fuel temperature in the fuel injection pump, the fuel temperature in the fuel return passage or the like may be used. When the fuel temperature in the fuel injection pump is detected, the viscosity of the fuel in the fuel injection pump can be more accurately predicted.

In the above embodiment, the present invention has been applied to the electronically controlled diesel engine in a motor vehicle provided with the spill ring as being the fuel injection quantity control actuator, however, it is apparent that the scope of the present invention need not necessarily be limited to this, and the present invention is applicable to the diesel engine for general use provided with the fuel injection quantity control actuator of any other type.

What is claimed:

1. A method of adaptively controlling individual cylinder fuel injection quantities in an electronically controlled diesel engine, wherein rpm variations of every explosion cylinder are detected from engine speeds and compared with a mean value of the rpm variations of all the cylinders, a correction quantity to be increased or decreased is learned in accordance with an rpm variation deviation or every cylinder until the rpm variations of the cylinders become uniform, and a spill actuator is adjusted for every cylinder, so that engine vibrations due to a dispersion in fuel injection quantity between the cylinders can be reduced, characterized in that said method comprises the steps of:

detecting engine temperature or fuel temperature;
  determining an rpm variation deviation from a difference between a mean rpm variation of all the cylinders and the rpm variations of the respective cylinders;
  determining an everytime correction quantity in accordance with said rpm variation deviation and said engine temperature or said fuel temperature; and
  determining an individual cylinder correction quantity by integrating said everytime correction quantities of every cylinder.

2. A method of adaptively controlling as set forth in claim 1, wherein said engine temperature is regarded as a coolant temperature.

3. A method of adaptively controlling as set forth in claim 1, wherein said fuel temperature is regarded as fuel temperature in a fuel injection pump.

4. A method adaptively controlling as set forth in claim 1, wherein said everytime correction quantity is reduced to a small value as said rpm variation deviation becomes smaller, when said engine temperature or said fuel temperature is lower than normal temperature.

5. A method of adaptively controlling as set forth in claim 1, wherein said everytime correction quantity is reduced to a small value as said rpm variation deviation becomes smaller, and a non-sensitive zone to said rpm variation deviation is expanded, when said engine temperature or said fuel temperature is lower than normal temperature.

6. A device for adaptively controlling individual cylinder fuel injection quantities in an electronically controlled diesel engine, wherein said device comprises:

a fuel injection pump including a spill ring and a spill actuator, for controlling fuel injection quantities;

injection nozzles for injecting fuel discharged from a fuel injection pump into combustion chambers;

an accelerator sensor for detecting an accelerator opening;

an engine rotation sensor for detecting an engine speed;

a temperature sensor for detecting engine temperature or fuel temperature; and a control unit for determining a target injection quantity at least from said accelerator opening and said engine speed, controlling said spill actuator so that fuel of target injection quantity can be discharged from said fuel injection pump, determining an everytime correction quantity in accordance with an rpm variation deviation, obtained from a difference between a mean rpm variation of all the cylinders and the rpm variations of the respective cylinders, and said engine temperature or said fuel temperature so as to eliminate a dispersion in the rpm variation, determining an individual cylinder correction quantity by interating said everytime correction quantities of every cylinder, and controlling said spill actuator for every cylinder in accordance with said individual cylinder correction quantity.

7. A method of adaptively controlling individual cylinder fuel injection quantities in an electronically controlled diesel engine, wherein rpm variations of every explosion cylinder are detected from engine speeds and compared with a mean value of the rpm variations of all the cylinders, a correction quantity to be increased or decreased is learned in accordance with an rpm variation deviation of every cylinder until the rpm variations of the cylinders become uniform, and a spill actuator is controlled with every cylinder, so that engine vibrations due to a dispersion in fuel injection quantity between the cylinders can be reduced, characterized in that said method comprises the steps of:

detecting engine temperature or fuel temperature;

determining the rpm variation deviation from a difference between a mean rpm variation and the rpm variations of the respective cylinders;

determining an rpm variation deviation for the control in accordance with said rpm variation deviation and said engine temperature or said fuel temperature;

determining an everytime correction quantity in accordance with said rpm variation deviation for the control; and determining an individual cylinder correction quantity by integrating said everytime correction quantities of every cylinder.

* * * * *

UNITED STATES PATENT AND TRADEMARK OFFICE
CERTIFICATE OF CORRECTION

PATENT NO. : 4,590,907
DATED : May 27, 1986
INVENTOR(S) : K. Tsukamoto et al.

It is certified that error appears in the above-identified patent and that said Letters Patent is hereby corrected as shown below:

Column 1, line 32 and line 33, in line 32 change "comfortable-" to --comfort-- and in line 33, omit "ness".

Column 1, line 49, before "designated" insert --is--.

Column 1, line 62, change "enabling to offer" to --offering--.

Column 1, line 65, change "is" to --could be--.

Figure 1:
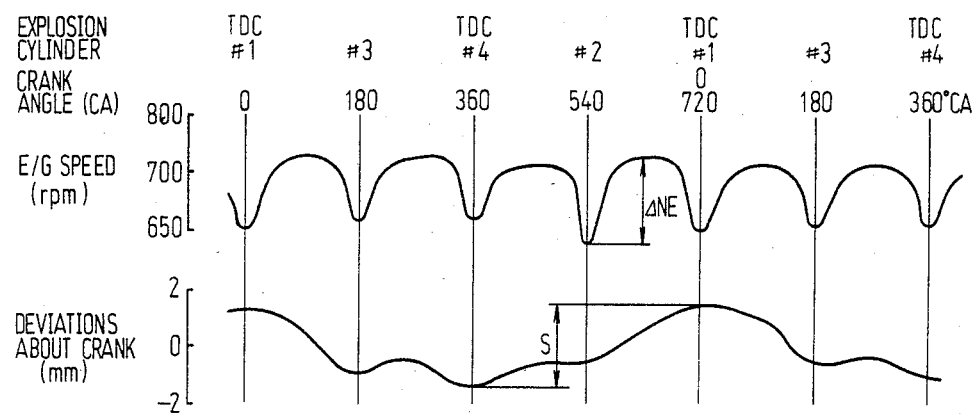
FIG. 1 is a graphic chart showing the relationship between the rpm variation and surging of deviations about the crank in the conventional electronically controlled diesel engine.
Figure 2:
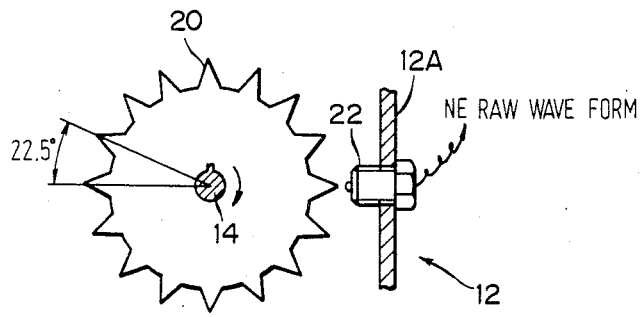
FIG. 2 is a sectional view showing the arrangement of the engine rotation sensor used in the conventional electronically controlled diesel engine.

Column 1, line 68, change "FIG. 2 for example, an" to --FIG. 2. For example, an--.

Column 2, line 2, after "corrected" insert a comma.

Column 2, line 8, change "FIG. 3, an rpm" to --FIG. 3. An rpm--.

Column 2, line 44, between "quantity" and "as being" insert --is considered--.

Column 3, line 64, between "variation" and "of" insert --deviation--.

UNITED STATES PATENT AND TRADEMARK OFFICE
CERTIFICATE OF CORRECTION

PATENT NO. : 4,590,907

DATED : May 27, 1986

INVENTOR(S) : K. Tsukamoto et al.

It is certified that error appears in the above-identified patent and that said Letters Patent is hereby corrected as shown below:

Column 4, line 1, change "determing" to --determining--.

Column 4, line 49, change "quality" to --quantity--.

Column 4, line 53, omit "enabling to" and change "reduce" to --reducing--.

Column 5, line 11, change "electronicaly" to --electronically--.

Column 6, line 38, change "(hereinafter referred to an a" to --(hereinafter referred to as a--.

Column 6, line 59, change "eircuit" to "circuit".

Column 7, line 34, change "-NE4-" to ---$NE_4$---.

Column 8, line 58, change "$A_9$ ($DDNE_p$)" to --$A_9 = g\ (DDNE_p)$--.

Column 9, line 30, change "is immediately" to --is, immediately--.

UNITED STATES PATENT AND TRADEMARK OFFICE
CERTIFICATE OF CORRECTION

PATENT NO. : 4,590,907

DATED : May 27, 1986

INVENTOR(S) : K. Tsukamoto et al.

It is certified that error appears in the above-identified patent and that said Letters Patent is hereby corrected as shown below:

Column 9, line 54, change "equals to" to --becomes equal to--.

Column 9, line 57, change "equals to" to -- becomes equal to--.

Column 9, line 67, change "equals to" to --becomes equal to--.

Column 10, line 62, after "as" at the end of the line, insert --a--.

Signed and Sealed this
Eleventh Day of November, 1986

Attest:

DONALD J. QUIGG

*Attesting Officer*   *Commissioner of Patents and Trademarks*